March 3, 1953  G. T. DALTON  2,629,959
FISHHOOK
Filed Jan. 26, 1951
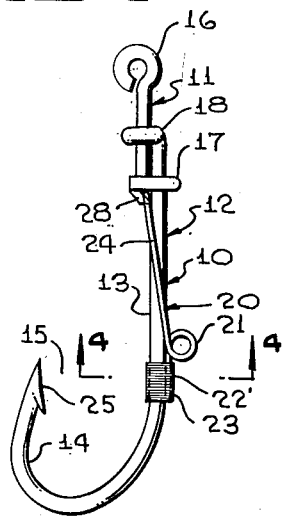
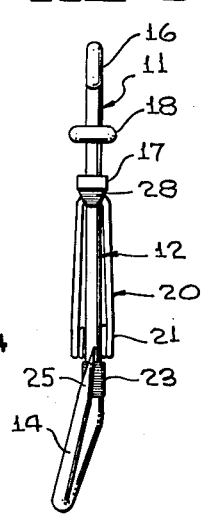
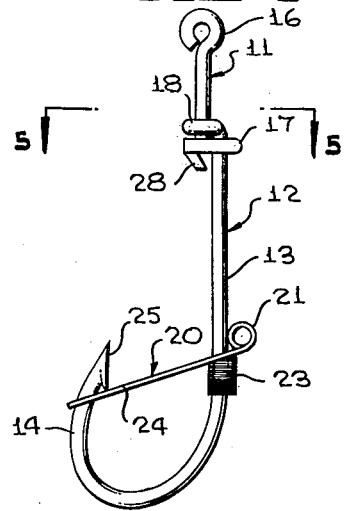
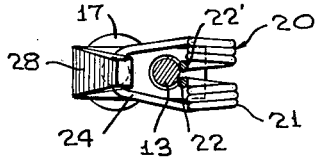
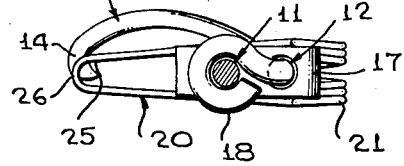
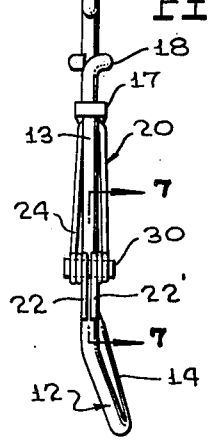
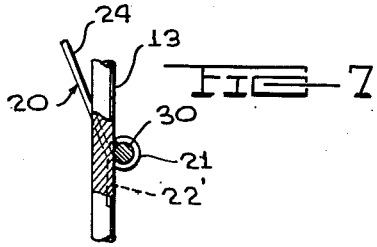
INVENTOR.
GEORGE T. DALTON
BY
McMorrow, Berman & Davidson
ATTORNEYS Patented Mar. 3, 1953

2,629,959

UNITED STATES PATENT OFFICE 2,629,959

FISHHOOK

George T. Dalton, Miami Springs, Fla.

Application January 26, 1951, Serial No. 207,965

3 Claims. (Cl. 43—37)

This invention relates to fishing equipment, and more particularly to a fishhook adapted to prevent the escape of a fish that has once been hooked.

An object of this invention is to provide a fishhook having an open mouth and including a lock bar which is actuable to a position bridging the open mouth of the fishhook in response to a strike, to thereby prevent the escape of the striking fish.

Another object of this invention is to provide a fishhook which will easily penetrate the flesh of the striking fish and will prevent the hook from working out of the flesh until manually manipulated, consequently preventing the escape of the striking fish.

A further object of this invention is to provide a barbless fishhook adapted to prevent the escape of a fish which has once been hooked, yet does not injure an undersized or unwanted striking fish to any great degree, so that the unwanted fish can be returned to the water.

A still further object of this invention is to provide a fishhook adapted to prevent the escape of a fish which has once been hooked, which is relatively simple in structure and cheap to manufacture.

The above and still further objects and advantages of the present invention will become apparent from a consideration of the following detailed description of the invention when taken in conjunction with the accompanying drawings, wherein:

Figure 1 is a side elevational view of the fishhook constructed according to the present invention, with the block bar thereof held in a set position contiguous to the shank of the fishhook;

Figure 2 is an end elevational view of the fishhook of the present invention taken from the left of Figure 1;

Figure 3 is an elevational view of a fishhook constructed according to the present invention, showing the block bar in the normal released position bridging the hook mouth after a strike;

Figure 4 is an enlarged sectional view taken along the line 4—4 of Figure 1;

Figure 5 is an enlarged sectional view taken along the line 5—5 of Figure 3;

Figure 6 is a rear elevational view of a modified form of the fishhook of the present invention; and Figure 7 is a fragmentary detail view taken along the line 7—7 of Figure 6, with parts broken away and shown in section.

Referring now more particularly to the drawings, wherein like reference numerals have been used throughout the several views to designate like parts, there is shown the fishhook of the present invention, generally designated by the reference numeral 10, which includes a supporting shank 11 and a fishhook 12 including a stem 13, and a barbed bill 14 cooperating to define an open mouth 15.

Secured to or formed integrally with one end of the supporting shank 11 is an eye 16 which adapts the supporting shank for securement to a fish line, not shown. Disposed transversely of the other end of the supporting shank 11 and secured to or formed integrally therewith is a guide ring 17 for the extension therethrough of the adjacent free end of the stem 13 of the fishhook 12. Circumposed about the supporting shank 11 is another guide ring 18 which is secured to the end of the stem 13 adjacent thereto. The guide rings 17 and 18 cooperate with the supporting shank 11 and the fishhook stem 13 to mount the fishhook stem for extensile movement with respect to the supporting shank 11 in response to a strike.

Positioned contiguous to the fishhook stem 13 is a lock bar 20 which is mounted on the stem 13 intermediate the ends thereof for swinging movement from the set position extending along the stem 13 to a normally released position bridging the hook mouth 15. The lock bar 20 is fabricated of resilient material bent intermediate its ends to form a coil spring 21, one end portion of the lock bar being formed into depending lugs 22 and 22' which are securable to the fishhook stem 13 by means of wire 23 or the like. The other end portion of the lock bar 20 is formed into a U-shaped body 24 which is engageable about the barbed end 25 of the bill 14 of the hook 12. It is to be noted that the barbed end 25 of the hook 12 is bent toward the stem 13, whereby the bight 26 of the U-shaped body 24 clears the barbed end 25 and engages the outer side of the bill 14 upon movement of the lock bar 20 to the released position illustrated in Figure 3.

Dependingly carried by the supporting shank 17 is a keeper 28 which engages the bight 26 of the lock bar 20 for holding the latter in the set position illustrated in Figure 1 against the tension of the coil spring 21. The lock bar 20 is releasable from the keeper 28 and movable into the released position illustrated in Figure 3 upon extensile movement of the fishhook shank 13 in response to the strike of a fish.

In actual use, the lock bar 20 is urged into the position illustrated in Figure 1 against the tension of the spring 21 and held in the set position by means of the depending keeper 28. When a strike occurs, the fishhook stem 13 is extended with respect to the supporting shank 11 and causes the lock bar 20 to be disengaged from the keeper 28. Upon release from the keeper 28, the coil spring urges the lock bar 20 into the position illustrated in Figure 3, wherein escape of a fish which has been hooked is prevented.

In Figures 6 and 7 there is shown a modified form of the fishhook of the present invention in which the lock bar 20 is supported on a pin 30 which is secured transversely of the fishhook stem 13 intermediate the ends thereof. As clearly illustrated in Figure 7, the coil spring 21 is circumposed about the pin 30, while the depending lugs 22 and 22' are welded, or similarly secured to the stem 13.

Although the fishhook illustrated in the drawings has a barbed bill, it is to be understood that an unbarbed or barbless fishhook can be used. When using a barbless fishhook, the bill is suitably burred at the free end thereof to prevent the bait from sliding off of the hook. In the event that a barbless fishhook is used, undersized or unwanted fish will not be injured to any great degree, so that they can be returned to the water.

It is readily apparent that numerous other modifications can be made without departing from the spirit of the invention as set forth in the appended claims.

What I claim is:

1. A fishhook comprising a supporting shank, means extending from one end of said shank for attachment to a fishing line, a first guide ring arranged transversely of and on one side of said shank adjacent the other end of the latter and fixedly secured to said shank, a fishhook including a stem and a barbed bill secured to one end of said stem arranged so that the stem extends through and is slidably supported in said guide ring, a second guide ring arranged transversely of and on one side of said stem adjacent the other end of the latter and fixedly secured to said stem, said second ring being circumposed about and slidably receiving said supporting shank, a spring biased lock bar arranged longitudinally of said stem intermediate said second guide ring and said barbed bill and having one end connected to said stem at a point spaced from said second guide ring for swinging movement of its other end from its longitudinal position to a position extending across and in engagement with said barbed bill, and a keeper carried by said first ring intermediate said second ring and said one connected end of said lock bar and, said keeper being engageable with the other end of said lock bar for holding the lock bar in its longitudinal position against the section of the spring.

2. A fishhook comprising a supporting shank, means extending from one end of said shank for attachment to a fishing line, a first guide ring arranged transversely of and on one side of said shank adjacent the other end of the latter and fixedly secured to said shank, a fishhook including a stem and a barbed bill secured to one end of said stem arranged so that the stem extends through and is slidably supported in said guide ring, a second guide ring arranged transversely of and on one side of said stem adjacent the other end of the latter and fixedly secured to said stem, said second ring being circumposed about and slidably receiving said supporting shank, a lock bar having a coil spring on one end thereof arranged longitudinally of said stem intermediate said second guide ring and said barbed bill and having the coil spring connected to said stem at a point spaced from said second guide ring for swinging movement of the other end of said lock bar from its longitudinal position to a position extending across and in engagement with said barbed bill, and a keeper carried by said first ring intermediate said second ring and said coil spring and, said keeper being engageable with the other end of said lock bar for holding the lock bar in its longitudinal position against the action of the spring.

3. A fishhook comprising a supporting shank, means extending from one end of said shank for attachment to a fishing line, a first guide ring arranged transversely of and on one side of said shank adjacent the other end of the latter and fixedly secured to said shank, a fishhook including a stem and a barbed bill secured to one end of said stem arranged so that the stem extends through and is slidably supported in said guide ring, a second guide ring arranged transversely of and on one side of said stem adjacent the other end of the latter and fixedly secured to said stem, said second ring being circumposed about and slidably receiving said supporting shank, a pivot pin projecting transversely of said stem adjacent said barbed bill, a lock bar having a coil spring on one end thereof arranged longitudinally of said stem intermediate said second guide ring and said barbed bill, said spring being connected to said pivot pin and said stem for swinging movement of said lock bar from its longitudinal position to a position extending across and in engagement with said barbed bill, and a keeper carried by said first ring and engageable with the other end of said lock bar for holding the lock bar in its longitudinal position against the action of the spring.

GEORGE T. DALTON.

REFERENCES CITED

The following references are of record in the file of this patent:

UNITED STATES PATENTS

| Number | Name | Date |
| --- | --- | --- |
| 377,294 | Dietz | Jan. 31, 1888 |
| 1,293,127 | Lantz | Feb. 4, 1919 |
| 1,399,648 | Partello | Dec. 6, 1921 |
| 1,869,293 | Wolford | July 26, 1932 |
| 2,234,516 | Clark | Mar. 11, 1941 |
| 2,571,222 | Dyer | Oct. 16, 1951 |